(12) United States Patent
Dong et al.

(10) Patent No.: US 12,474,262 B2
(45) Date of Patent: Nov. 18, 2025

(54) SINGLE-SHOT MULTI-FRAME ULTRAFAST TERAHERTZ IMAGING METHOD AND SYSTEM

(71) Applicant: INSTITUT NATIONAL DE LA RECHERCHE SCIENTIFIQUE, Quebec (CA)

(72) Inventors: Junliang Dong, Longueuil (CA); Pei You, Urbana, IL (US); Alessandro Tomasino, Lausanne (CH); Aycan Yurtsever, Longueuil (CA); Yoann Jestin, Montreal (CA); Roberto Morandotti, Montreal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 175 days.

(21) Appl. No.: 18/569,343

(22) PCT Filed: Jun. 14, 2022

(86) PCT No.: PCT/CA2022/050942
§ 371 (c)(1),
(2) Date: Dec. 12, 2023

(87) PCT Pub. No.: WO2023/272377
PCT Pub. Date: Jan. 5, 2023

(65) Prior Publication Data
US 2024/0385110 A1    Nov. 21, 2024

Related U.S. Application Data

(60) Provisional application No. 63/202,886, filed on Jun. 29, 2021.

(51) Int. Cl.
*G01N 21/3586* (2014.01)
*G01N 21/17* (2006.01)
(Continued)

(52) U.S. Cl.
CPC ......... *G01N 21/3586* (2013.01); *G01N 21/17* (2013.01); *G01N 2021/1765* (2013.01);
(Continued)

(58) Field of Classification Search
CPC .................. G01N 21/17; G01N 21/21; G01N 2021/1765; G01N 2021/1772; G01N 2021/1791; G01N 2201/061; G03B 39/00
See application file for complete search history.

(56) References Cited

U.S. PATENT DOCUMENTS 9,335,213 B2 * 5/2016 Sharma ................. G01J 3/453
10,175,111 B2 * 1/2019 Ozaki ...................... G01J 3/42
(Continued)

OTHER PUBLICATIONS

International Search Report and Written Opinion issued in PCT application No. CA2022/050942.
(Continued)

*Primary Examiner* — Drew A Dunn

(57) ABSTRACT

A method and a system for single-shot multi-frame ultrafast terahertz imaging of a scene, the method comprising generating a pump beam and a probe beam: generating a THz beam from the pump beam and passing the THz beam through the scene: multiplexing the probe beam in the time domain and in the spatial-frequency domain, yielding a multiplexed probe beam; detecting a THz beam passing through the scene; guiding the multiplexed probe beam to a THz detection crystal and converting the multiplexed probe beam into mutually orthogonal linear polarized beams; guiding the mutually orthogonal linear polarized beams to a camera; and recovering frames of the scene from multiplexed images acquired by the camera.

20 Claims, 14 Drawing Sheets

(51) Int. Cl.
*G03B 39/00* (2021.01)
*G01N 21/21* (2006.01)

(52) U.S. Cl.
CPC ..... *G01N 2021/1791* (2013.01); *G01N 21/21* (2013.01); *G01N 2201/061* (2013.01); *G03B 39/00* (2013.01)

(56) References Cited

U.S. PATENT DOCUMENTS

| | | | |
|---|---|---|---|
| 11,604,139 B2* | 3/2023 | Piccoli | G01N 21/3581 |
| 2017/0336262 A1* | 11/2017 | Ozaki | G01J 3/0224 |
| 2021/0096066 A1* | 4/2021 | Piccoli | G01N 21/3581 |
| 2022/0021473 A1* | 1/2022 | Dong | H01P 3/10 |

OTHER PUBLICATIONS

Moon et al., Single-shot imaging of microscopic dynamic scenes at 5 THz frame rates by time and spatial frequency multiplexing, Optic Express 4469, vol. 28 No. 4/17/Feb. 2020.
Bidare, P., Bitharas, I., Ward, R. M., Attallah, M. M. & Moore, A. J. Fluid and particle dynamics in laser powder bed fusion. Acta Mater. 142, 107-120 (2018).
Blanchard, F. et al. Real-time terahertz near-field microscope. Opt. Express 19, 8277 (2011).
Dong, J. et al. Nondestructive evaluation of forced delamination in glass fiber-reinforced composites by terahertz and ultrasonic waves. Compos. Part B Eng. 79, 667-675 (2015).
Dong, J., Wu, X., Locquet, A. & Citrin, D. S. Terahertz Super-resolution Stratigraphic Characterization of Multilayered Structures Using Sparse Deconvolution. IEEE Trans. Terahertz Sci. Technol. 7, 260-267 (2017).
Dong, R. et al. High-mobility band-like charge transport in a semiconducting two-dimensional metal-organic framework. Nat. Mater. 17, 1027-1032 (2018).
Ehn, A. et al. FRAME: femtosecond videography for atomic and molecular dynamics. Light Sci. Appl. 6, e17045-e17045 (2017).
Fülöp, J. A., Páfalvi, L., Almási, G. & Hebling, J. Design of high-energy terahertz sources based on optical rectification. Opt. Express 18, 12311 (2010).
Gao, L., Liang, J., Li, C. & Wang, L. V. Single-shot compressed ultrafast photography at one hundred billion frames per second. Nature 516, 74-77 (2014).
Gragston, M., Smith, C., Kartashov, D., Shneider, M. N. & Zhang, Z. Single-shot nanosecond-resolution multiframe passive imaging by multiplexed structured image capture. Opt. Express 26, 28441 (2018).
Guerboukha, H., Nallappan, K. & Skorobogatiy, M. Toward real-time terahertz imaging. Adv. Opt. Photonics 10, 843 (2018).
Jepsen, P. U., Cooke, D. G. & Koch, M. Terahertz spectroscopy and imaging—Modern techniques and applications. Laser Photon. Rev. 5, 124-166 (2011).
Lai, Y. et al. Single-Shot Ultraviolet Compressed Ultrafast Photography. Laser Photon. Rev. 14, 2000122 (2020).
Lane, P. A., Cunningham, P. D., Melinger, J. S., Esenturk, O. & Heilweil, E. J. Hot photocarrier dynamics in organic solar cells. Nat. Commun. 6, 7558 (2015).
Li, Z., Zgadzaj, R., Wang, X., Chang, Y.-Y. & Downer, M. C. Single-shot tomographic movies of evolving light-velocity objects. Nat. Commun. 5, 3085 (2014).
Liang, J. & Wang, L. V. Single-shot ultrafast optical imaging. Optica 5, 1113 (2018).
Luo, L. et al. Ultrafast manipulation of topologically enhanced surface transport driven by mid-infrared and terahertz pulses in Bi2Se3. Nat. Commun. 10, 607 (2019).
Mikami, H., Gao, L. & Goda, K. Ultrafast optical imaging technology: principles and applications of emerging methods. Nanophotonics 5, 441-453 (2016).
Mittleman, D. M. Twenty years of terahertz imaging [Invited]. Opt. Express 26, 9417 (2018).
Nakagawa, K. et al. Sequentially timed all-optical mapping photography (STAMP). Nat. Photonics 8, 695-700 (2014).
Olivieri, L. et al. Hyperspectral terahertz microscopy via nonlinear ghost imaging. Optica 7, 186 (2020).
Poulin, P. R. Irreversible organic crystalline chemistry monitored in real time. Science. 313, 1756-1760 (2006).
Qingli Zhou, Q. Z. & Xicheng Zhang, X. Z. Applications of time-resolved terahertz spectroscopy in ultrafast carrier dynamics (Invited Paper). Chinese Opt. Lett. 9, 110006-110009 (2011).
Richter, C. & Schmuttenmaer, C. A. Exciton-like trap states limit electron mobility in TiO2 nanotubes. Nat. Nanotechnol. 5, 769-772 (2010).
Shan, J. et al. Single-shot measurement of terahertz electromagnetic pulses by use of electro-optic sampling. Opt. Lett. 25, 426 (2000).
Siaulys, N., Gallais, L. & Melninkaitis, A. Direct holographic imaging of ultrafast laser damage process in thin films. Opt. Lett. 39, 2164 (2014).
Stantchev, R. I. et al. Noninvasive, near-field terahertz imaging of hidden objects using a single-pixel detector. Sci. Adv. 2, (2016).
Stantchev, R. I., Yu, X., Blu, T. & Pickwell-MacPherson, E. Real-time terahertz imaging with a single-pixel detector. Nat. Commun. 11, 2535 (2020).
Sun, Q. et al. Recent advances in terahertz technology for biomedical applications. Quant. Imaging Med. Surg. 7, 345-355 (2017).
Suzuki, T. et al. Sequentially timed all-optical mapping photography (STAMP) utilizing spectral filtering. Opt. Express 23, 30512 (2015).
Takasawa, K. et al. Single-Shot 2-D Burst Ultrafast THz Imaging Utilizing SF-STAMP. in 2019 Conference on Lasers and Electro-Optics Europe & European Quantum Electronics Conference (CLEO/Europe-EQEC) Part F140—, 1-1 (IEEE, (2019).
Teo, S. M., Ofori-Okai, B. K., Werley, C. A. & Nelson, K. A. Invited Article: Single-shot THz detection techniques optimized for multidimensional THz spectroscopy. Rev. Sci. Instrum. 86, 051301 (2015).
Tomasino, A. et al. Wideband THz Time Domain Spectroscopy based on Optical Rectification and Electro-Optic Sampling. Sci. Rep. 3, 3116 (2013).
Tonouchi, M. Cutting-edge terahertz technology. Nat. Photonics 1, 97-105 (2007).
Ulbricht, R., Hendry, E., Shan, J., Heinz, T. F. & Bonn, M. Carrier dynamics in semiconductors studied with time-resolved terahertz spectroscopy. Rev. Mod. Phys. 83, 543-586 (2011).
Wang, X., Cui, Y., Sun, W., Ye, J. & Zhang, Y. Terahertz polarization real-time imaging based on balanced electro-optic detection. J. Opt. Soc. Am. A 27, 2387 (2010).
Yue, Q.-Y., Cheng, Z.-J., Han, L., Yang, Y. & Guo, C.-S. One-shot time-resolved holographic polarization microscopy for imaging laser-induced ultrafast phenomena. Opt. Express 25, 14182 (2017).
Zhai, Z. H. et al. Time-resolved single-shot terahertz time-domain spectroscopy for ultrafast irreversible processes. Rev. Sci. Instrum. 87, (2016).
Zhao, J., E, Y., Williams, K., Zhang, X. & Boyd, R. Spatial Sampling of Terahertz Fields with Sub-wavelength Accuracyvia Probe Beam Encoding. Light Sci. Appl. (2019). doi:10.1038/s41377-019-0166-6.

\* cited by examiner

SINGLE-SHOT MULTI-FRAME ULTRAFAST TERAHERTZ IMAGING METHOD AND SYSTEM

CROSS-REFERENCE TO RELATED APPLICATIONS

This application is a National Entry Application of PCT application no PCT/CA2022/050942 filed on Jun. 14, 2022, and published in English under PCT Article 21(2), under publication no WO 2023/272377 which itself claims benefit of U.S. provisional application Ser. No. 63/202,886, filed on Jun. 29, 2021.

FIELD OF THE INVENTION

The present invention relates to ultrafast terahertz imaging system and method.

BACKGROUND OF THE INVENTION

Imaging of transient events in their actual time of occurrence exerts compelling scientific significance and practical merits. Occurring in two-dimensional (2D) space and at femtosecond to picosecond time scales, these transient events reflect a number of fundamental mechanisms in physics, chemistry, and biology. Recently, imaging using terahertz (THz) radiation, electromagnetic waves with a frequency in a range between 0.1 THz and 10 THz) has attracted great attention due to its ability to see through advanced materials, including semiconductors, nanomaterials, topological insulators, as well as metal-organic frameworks (MOFs). Particularly, unlike X-rays, THz radiation has low photon energy, of the order of meV, and therefore, does not cause deleterious effects in sensitive materials and biological tissues. In addition, THz imaging is capable of spectroscopic identification of materials, as key fingerprints of a number of chemical compounds are located in this frequency range. Consequently, imaging of ultrafast transient events using THz radiation is of significant interest to provide an effective methodology to spectroscopically investigate ultrafast processes in advanced materials that are opaque to optical frequencies.

Recent studies mainly focus on exploiting the time-resolved THz spectroscopy for the characterization of ultrafast processes in advanced materials. Relying on a pump-probe configuration, with optical-pump/THz probe or THz-pump/THz-probe, investigated methods allow for the capture of ultrafast dynamics through repeated measurements on a single spot of a sample. However, a number of ultrafast phenomena, such as laser-induced material damage and chemical reactions for instance, are either non-repeatable or difficult to reproduce, and the pump-probe methods are inapplicable. Single-shot THz pulse detection methods are combined with time-resolved THz spectroscopy. This time-resolved single-shot THz spectroscopy has been contemplated to provide transient THz spectroscopic information at a specific time delay with respect to the ultrafast process. By using angular-multiplexed femtosecond laser pulses, a burst of THz pulses, containing 2 sub-THz pulses with an adjustable time delay, can be generated and utilized to probe the single-shot event at two different time delays.

Besides the single-point investigation of ultrafast processes using time-resolved THz spectroscopy, a single-shot 2D burst ultrafast THz imaging method based on sequentially timed all-optical mapping photography (STAMP) has been developed. In sequentially timed all-optical mapping photography (STAMP), an ultrafast event is captured using a frequency chirped probe laser pulse where the individual frequency component exactly corresponds to the time, and then spatially separated with a dispersive optical element. For the implementation of THz-STAMP, THz 2D burst images are achieved by capturing electro-optic sampling (EOS) images with a chirped ultrafast laser pulse operating in the sequentially timed all-optical mapping photography (STAMP) scheme.

In methods based on time-resolved single-shot THz spectroscopy, since the ultrafast phenomenon captured corresponds to only one single spot of the sample, no spatial information is achieved. Although able to provide both the spatial and temporal information of an ultrafast event based on spectral encoding, the trade-off between the pulse width and spectral bandwidth of the chirped probe pulse limits the temporal resolution of THz-STAMP. In addition, the achieved temporal resolution is rigid, requiring custom adjustments and calibration to vary the temporal properties, therefore, lacking versatility for imaging a broad variety of dynamic scenes.

There is still a need in the art for single-shot multi-frame ultrafast terahertz imaging method and system.

SUMMARY OF THE INVENTION

More specifically, in accordance with the present invention, there is provided a system for single-shot multi-frame ultrafast terahertz imaging of a scene, the system comprising a laser producing a pump beam and a probe beam; a THz generator generating a THz beam from the pump beam, the THz beam being passed through the scene; a multiplexer selected for multiplexing the probe beam in the time domain and in the spatial-frequency domain, yielding a multiplexed probe beam; a THz detector detecting a THz beam passing through the scene; a first optical lens guiding the multiplexed probe beam to the THz detector; a polariser selected for conversion of the multiplexed probe beam into mutually orthogonal linear polarized beams; a camera; an a second optical lens selected for directing the mutually orthogonal linear polarized beams to the camera.

There is further provided a method for single-shot multi-frame ultrafast terahertz imaging of a scene, the method comprising generating a pump beam and a probe beam; generating a THz beam from the pump beam and passing the THz beam through the scene; multiplexing the probe beam in the time domain and in the spatial-frequency domain, yielding a multiplexed probe beam; detecting a THz beam passing through the scene; guiding the multiplexed probe beam to a THz detection crystal and converting the multiplexed probe beam into mutually orthogonal linear polarized beams; guiding the mutually orthogonal linear polarized beams to a camera; and recovering frames of the scene from multiplexed images acquired by the camera.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1A: uniformly illuminating a sample with an image content that locates primarily near the origin in the Fourier domain; FIG. 1B: Illuminating the sample with sinusoidal intensity modulation effectively placing two images of the object in the unexploited space in the Fourier domain; FIG. 1C and FIG. 1D: each image copy filling only a fraction of the available reciprocal space;

FIG. 5A: an apple is uniformly illuminated in the real space, the frequency content of the resulting image is band-limited and mainly locates at the central region in the Fourier domain; FIG. 5B: the apple is illuminated with a sinusoidal intensity modulation produces two image copies of the apple in two unexploited regions, symmetrically located in the Fourier domain with respect to the origin, their actual locations, namely the distance from the origin, depend on the spatial-frequency k of the modulation pattern; FIG. 5C and FIG. 5D: image copies are moved to different unexploited regions in the Fourier domain by varying the orientations of the modulation pattern;

FIG. 6A shows the entire imaging system; FIG. 6B shows detailed illumination of the probe-beam multiplexing, with BS1-BS6, beam-splitter; ODL1-ODL4, optical delay lines; RG1-RG4, Ronchi gratings; L1-L4, lens; M1-M2, mirrors; TPX1-TPX3, THz lens; WP, quarter-wave plate;

FIG. 7A is a schematic of an experimental step corning the formation of the collimated THz beam for capturing the dynamic scene; FIG. 7B: THz waveforms acquired via the EOS technique with and without the insertion of the Teflon sample; FIG. 7C: multiplexed image acquired by the CCD camera through a single exposure; FIG. 7D: the 2D Fourier transform of FIG. 7C; FIG. 7E: the recovered frames from the multiplexed image in FIG. 7C; FIG. 7F: the recovered frames that were captured when the probe beam arrived 50 fs earlier relative to the case in FIG. 7E; FIG. 7G: the recovered frames that were captured when the probe beam arrived 50 fs later relative to the case in FIG. 7E;

FIG. 8A is a schematic of the experimental setup corning the formation of collimated THz beam for capturing the dynamic scene; FIG. 8B shows pump-probe measurement and the multi-cycle THz pulse for imaging; FIG. 8C shows the multiplexed image acquired by the camera; FIG. 8D shows the 2D Fourier transform of FIG. 8C, with image copies from each sub-pulse circled.; FIG. 8E shows the recovered frames from the multiplexed image; FIG. 8F shows the recovered frames when the optical pump pulse was shifted 1.20 ps to the left relative to the case in FIG. 8E;

FIG. 8G shows the recovered frames when the optical pump pulse was shifted 1.20 ps to the right relative to the case in FIG. 8E;

FIG. 9A shows the raw multiplexed image captured by the CCD; FIG. 9B shows the 2D Fourier transform of FIG. 9A; FIG. 9C shows the 2D band-pass filter with a width of w used to select the individual frame; FIG. 9D shows the band-pass filter is multiplied with the Fourier transform of the raw image, in turn removing the other image copies; FIG. 9E shows the filtered frequency content is shifted to the center of the Fourier domain, which transforms the sinusoidal modulation into a uniform illumination; FIG. 9F shows the fourth frame is recovered by applying the inverse Fourier transform of the filtered and rearranged spectrum in FIG. 9E;

FIGS. 10A-10F display the fourth frame that was extracted and recovered using different widths of the band-pass filter; FIG. 11A shows the fourth frame recovered; FIG. 11B shows the THz electric fields distribution across the line highlighted in FIG. 11A using different widths of the band-pass filter; FIG. 11C shows the spectrum of the THz source achieved from $LiNbO_3$.

DESCRIPTION OF ILLUSTRATIVE EMBODIMENTS

The present invention is illustrated in further details by the following non-limiting examples.

In the following, 'single-shot' describes the process of capturing the entire dynamic process in real-time, in other words during the actual duration in which an event occurs, without repeating the event; 'ultrafast' refers to imaging speeds of at least 100 million frames per second, which correspond to inter-frame time intervals of at most 10 ns.

Figure 1:
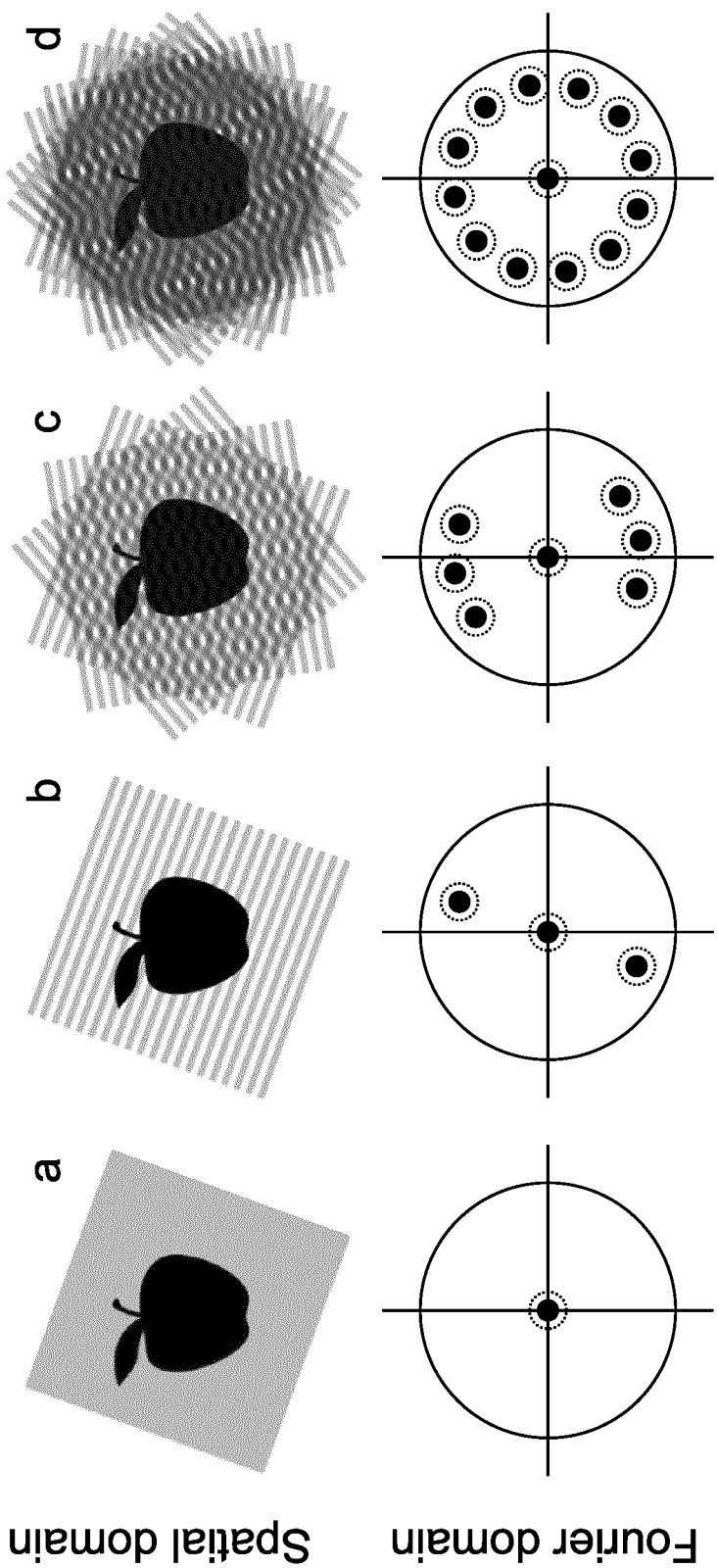
FIG. 1 show a schematic view of spatial-frequency multiplexing.

The principle of spatial frequency multiplexing is schematically illustrated in FIG. 1 (see FIG. 5 discussed for more details hereinbelow). When a sample is uniformly illuminated, the image content locates primarily near the origin in the Fourier domain (FIG. 1A); illuminating the sample with sinusoidal intensity modulation effectively positions two images of the object, referred to herein as image copies, in the unexploited space in the Fourier domain (FIG. 1B); each image copy filling only a fraction of the available reciprocal space, thereby allowing for multiple-illumination schemes, i.e. multiplexing, without signal cross-talks (FIGS. 1C and 1D).

More precisely, FIG. 1A shows a uniformly illuminated sample together with its Fourier transform. Illuminating the same target with a sinusoidal modulation with a spatial frequency of $\bar{v}$ effectively places a pair of image copies of its object structure at $\pm\bar{v}$ in the Fourier domain. If instead the spatial frequency and/or the orientation of the modulation are altered for a number of illuminations, each respective image copy may be strategically placed at other regions in the Fourier domain. To recover the image, each individual frame, i. e. each image copy, is first isolated in the Fourier domain using a frequency band-pass filter, thus effectively removing all other image copies. The dimensions of the frequency band-pass filter set the final resolution of the extracted frames. The isolated data are then digitally transferred to the origin in the Fourier domain, thus transforming the modulation amplitude into a uniform illumination. Application of an inverse Fourier transform on the resulting filtered and rearranged data set transform spatial frequencies into intensity values, thus revealing the image information that was stored at an offset location in the Fourier domain.

Figure 2:
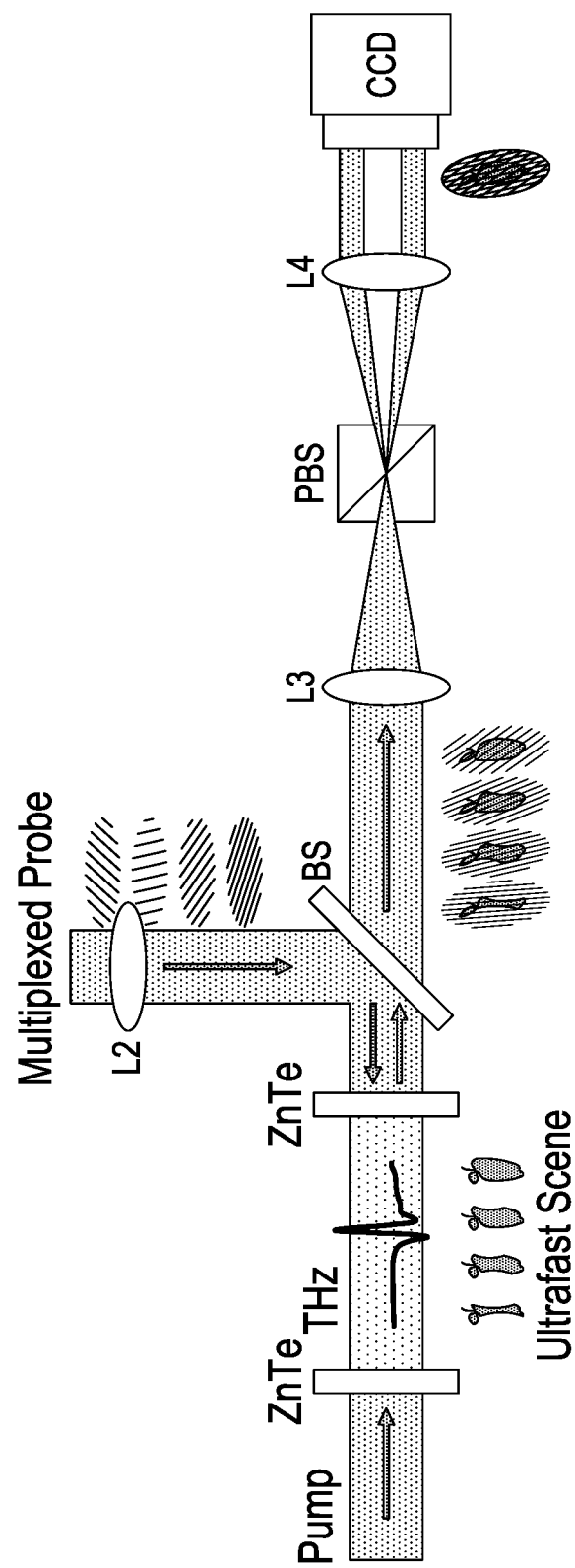
FIG. 2 is a schematic view of a single-shot multi-frame THz ultrafast system according to an embodiment of an aspect of the present disclosure.

FIG. 2 (see FIG. 6 discussed for more details hereinbelow) shows a single-shot multi-frame ultrafast THz imaging system according to an embodiment of an aspect of the present disclosure. The system is driven by a 800-nm Ti:Sapphire pulsed laser which produces pump and probe beams of a pulse duration in a range between about 50 fs and about 200 fs. A collimating THz beam, generated through optical rectification of the pump beam from a first Pockels crystal, such as a ZnTe, GaSe, or LiNbO3 crystal, for example, is directed through an ultrafast scene and then directed to a THz detector, such as a detection crystal, such as a second Pockels crystal such as a ZnTe, GaSe, or LiNbO3 crystal. The probe beam is used for electro-optic sampling (EOS) detection of the THz beam. By separating the probe beam (see beam splitter BS) into four sub-pulses with different structured patterns, namely different spatial frequencies, and different time delays (See FIG. 3), the multiplexed probe beam first illuminates the detection crystal, in the counter-propagation direction of the THz pulses. Following reflections from both surfaces of the first crystal, the multiplexed probe beam co-propagates with the THz pulse. The polarization of each sub-pulses of the multiplexed probe beam reflected from the left surface of the first crystal is modulated by the THz electric fields, and thus, carries the 2D information of the ultrafast scene at four different times. The multiplexed probe beam then passes through lenses and a polarization beam splitter (PBS) such as a Wollaston prism, for conversion into mutually orthogonal linear polarized beams. A charged-coupled device (CCD) camera is used to capture the two polarization intensities of the multiplexed probe beam, which are used to produce the image. The whole image acquired by the charged-coupled device (CCD) camera is the overlapped/multiplexed image of four different frames related to the four sub-pulses comprising the entire probe beam. Each frame, corresponding to the 2D information of observed ultrafast scene at different times, can be de-multiplexed and extracted via computational procedure for the analysis of the spatial spectrum, as described above.

Other THz generation method, such as using photoconductive antenna for example, may be contemplated.

Figure 3:
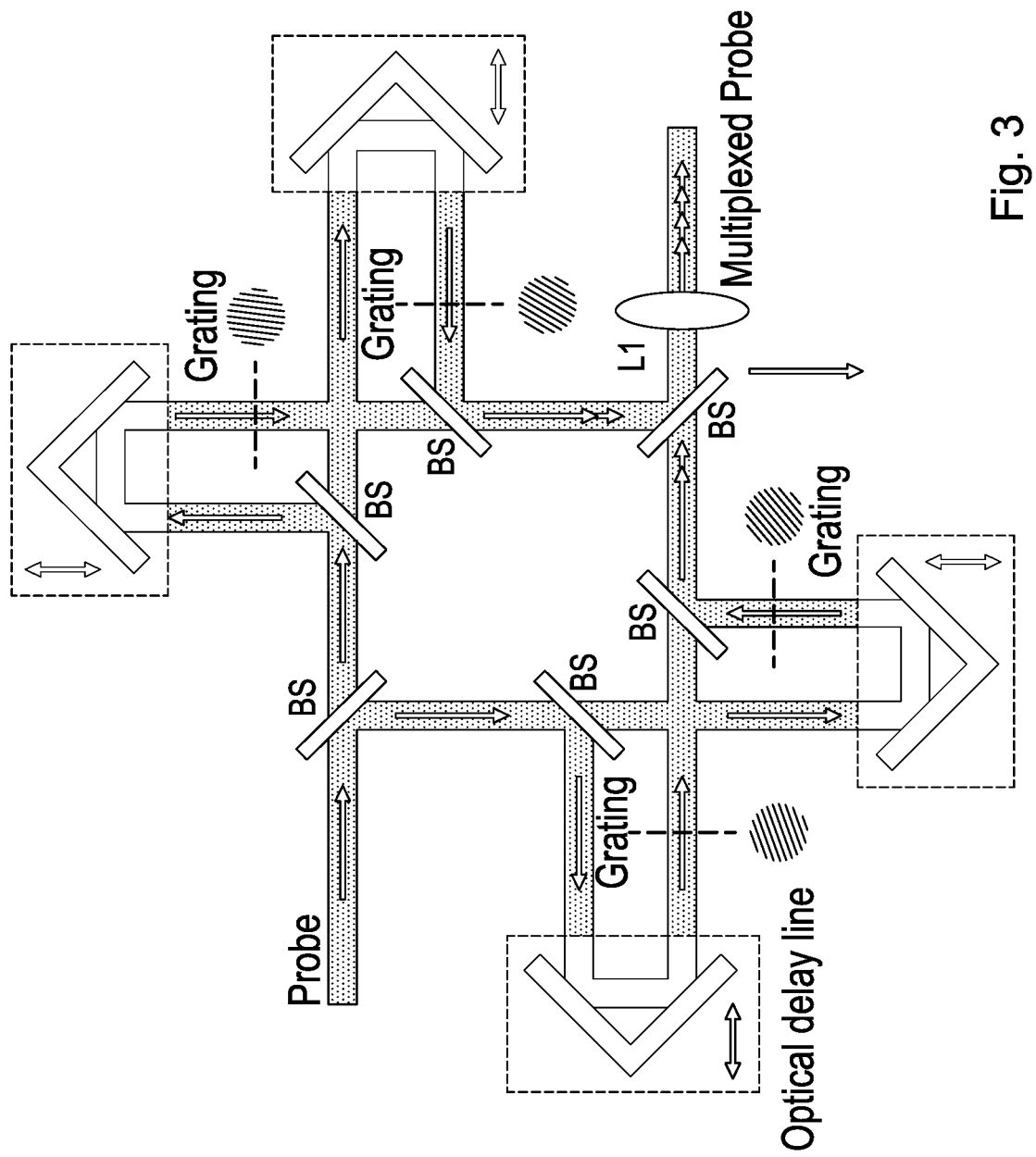
FIG. 3 is a schematical view of a system for generating a multiplexed probe beam according to an embodiment of an aspect of the present disclosure.

FIG. 3 shows a system for producing the multiplexed probe beam according to an embodiment of an aspect of the present disclosure. The initial probe beam is split into four equally intense sub-pulses by using beam-splitters (BS). Each sub-pulse is guided into an optical delay line to control the arrival time separately. After being delayed, the sub-pulses are sent through four Ronchi gratings (20 lp/mm), each Ronchi grating having a unique orientation for the spatial-frequency multiplexing. The ±1 diffraction orders of the beam are then collected with an imaging lens that forms sinusoidal fringe patterns in the probe volume. The four sub-pulses are then recombined through one last beam-splitter to form the multiplexed probe beam, the distance between the imaging lens and the gratings being selected exactly equal to the lens focal length for each sub-pulse.

Figure 4:
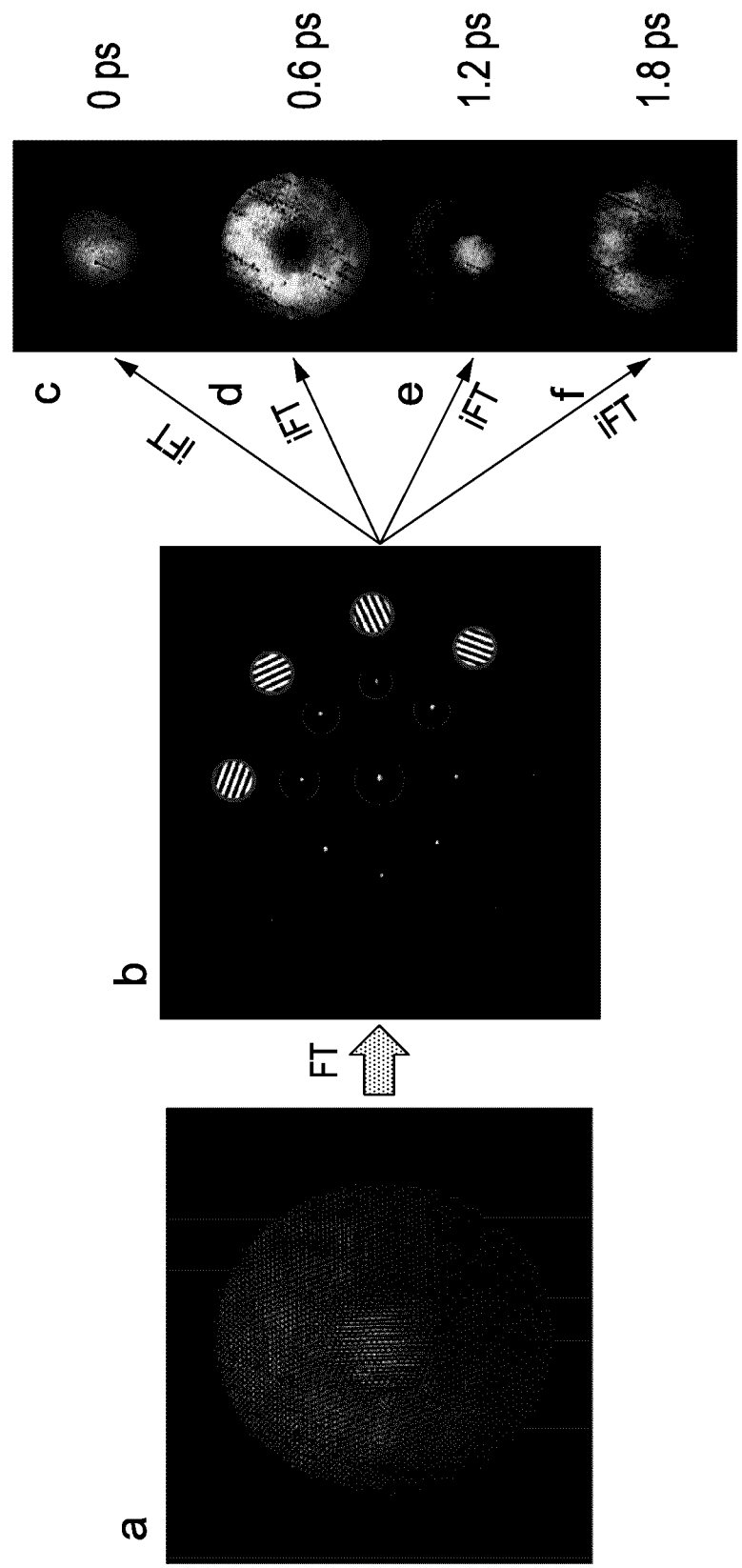
FIG. 4A shows raw and multiplexed images captured by the CCD camera in single-shot multi-frame ultrafast imaging of the propagation of a THz pulse transmitting a pinhole on a polymer sheet.
FIG. 4B shows the Fourier transform result of the images in FIG. 4A, where the locations of the four image copies are circled.
FIGS. 4C-4F show recovered images of each frame with time interval of 0.6 ps.

The system was used to capture the propagation of a THz pulse transmitting through a pinhole on a polymer sheet. A hole of a diameter of 2 mm was made in the center of a polymer sheet of a thickness of about 1 mm. The time interval between the sub-pulses of the multiplexed probe was set to be 0.6 ps. FIG. 4A shows the raw, overlapped/multiplexed image captured by the charged coupled device (CCD) camera. In FIG. 4B displaying the Fourier transform of FIG. 4A, the images probed by each sub-pulse appear as separated peaks symmetrically around the origin in the center. Each peak is isolated and extracted by applying a frequency bandpass filtering, as circled in FIG. 4B, and then shifted to the origin in the center. The images of each frame, corresponding to the THz beam patterns at different time spots, are successfully reconstructed by inverse Fourier transforms, as shown in FIGS. 4C-4F. The bright shade corresponds to the positive value of the THz electric field, while the dark shade corresponds to the negative value of the THz electric field.

Further details are now described, in relation to FIGS. 5-11.

Figure 5:
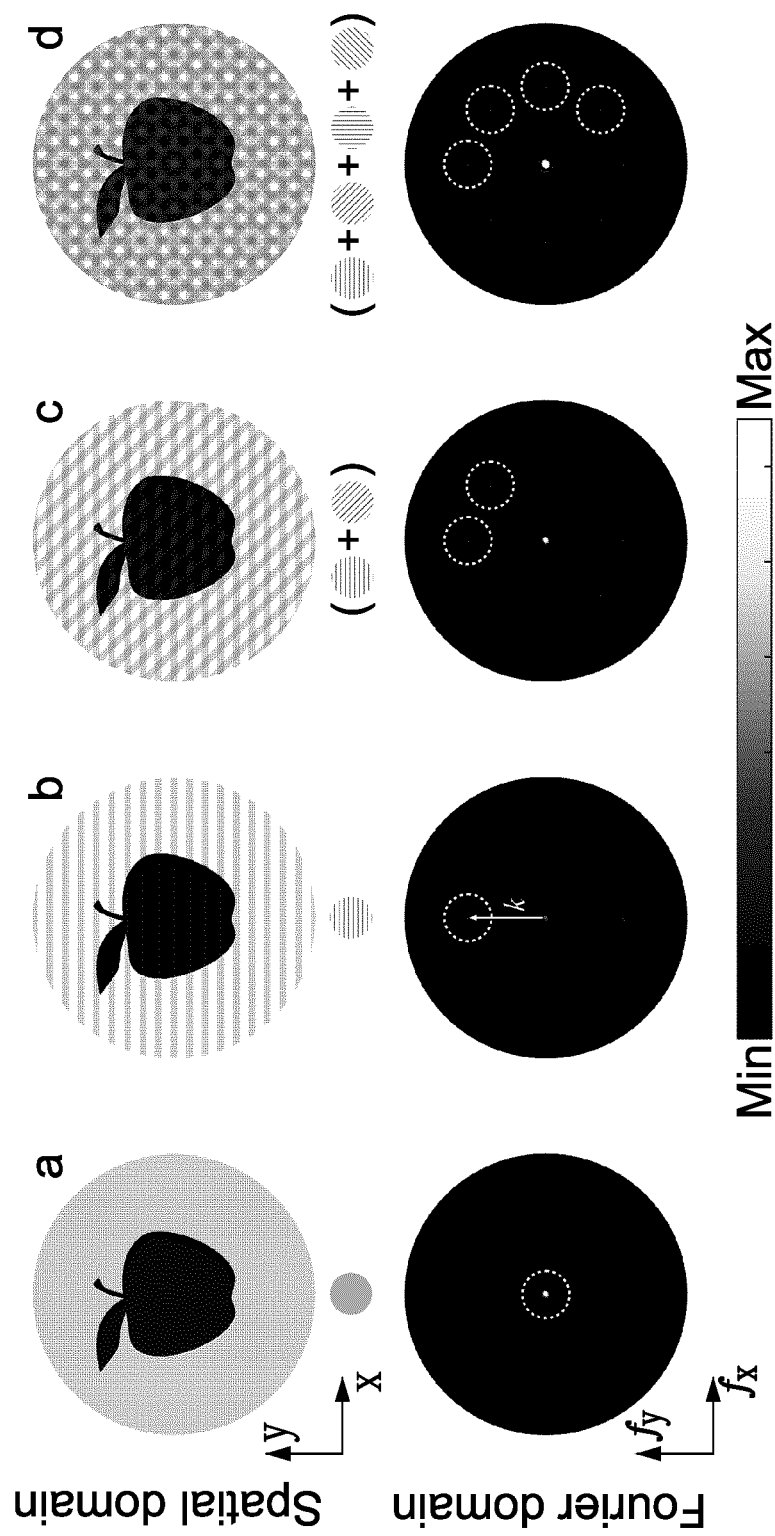
FIG. 5 show a schematic view of spatial-frequency multiplexing.

The basic principle of probe-beam multiplexing in the spatial-frequency domain is graphically illustrated in FIG. 5. When an object is uniformly illuminated, the power spectrum of the acquired image is band-limited and only occupies around the center of the Fourier domain, as shown in FIG. 5A. This is due to the fact that the information of the image are low-frequency components. If the same object is illuminated using a sinusoidal modulation with a spatial frequency k (modulation k-vector), a pair of 'image copies' of its object will occur at ±k in the Fourier domain, as shown in FIG. 5B. The locations of the image copies in the Fourier domain are determined by the spatial frequency and the orientation of the modulation as will be detailed hereinbelow. Since each image copy only occupies a small portion of the Fourier space, it is possible to realize multiplexing in the spatial-frequency domain by shifting the band-limited frequency content of an image to different unexploited regions. FIGS. 5C and 5D show that, when multiple illuminations are applied onto the object, by judiciously varying the orientations of modulation patterns, the image copies produced by each illumination can be shifted to distinct regions in the Fourier domain. Since there is no overlap occurs among the image copies in the Fourier domain, any one of them can be used to recover the original image of the object via a post-processing procedure. Such a strategy allows for the imaging of a dynamic scene using multiple, spatially modulated illumination patterns, which can be incorporated into the probe beam utilized to image the THz beam via the EOS technique.

Figure 6:
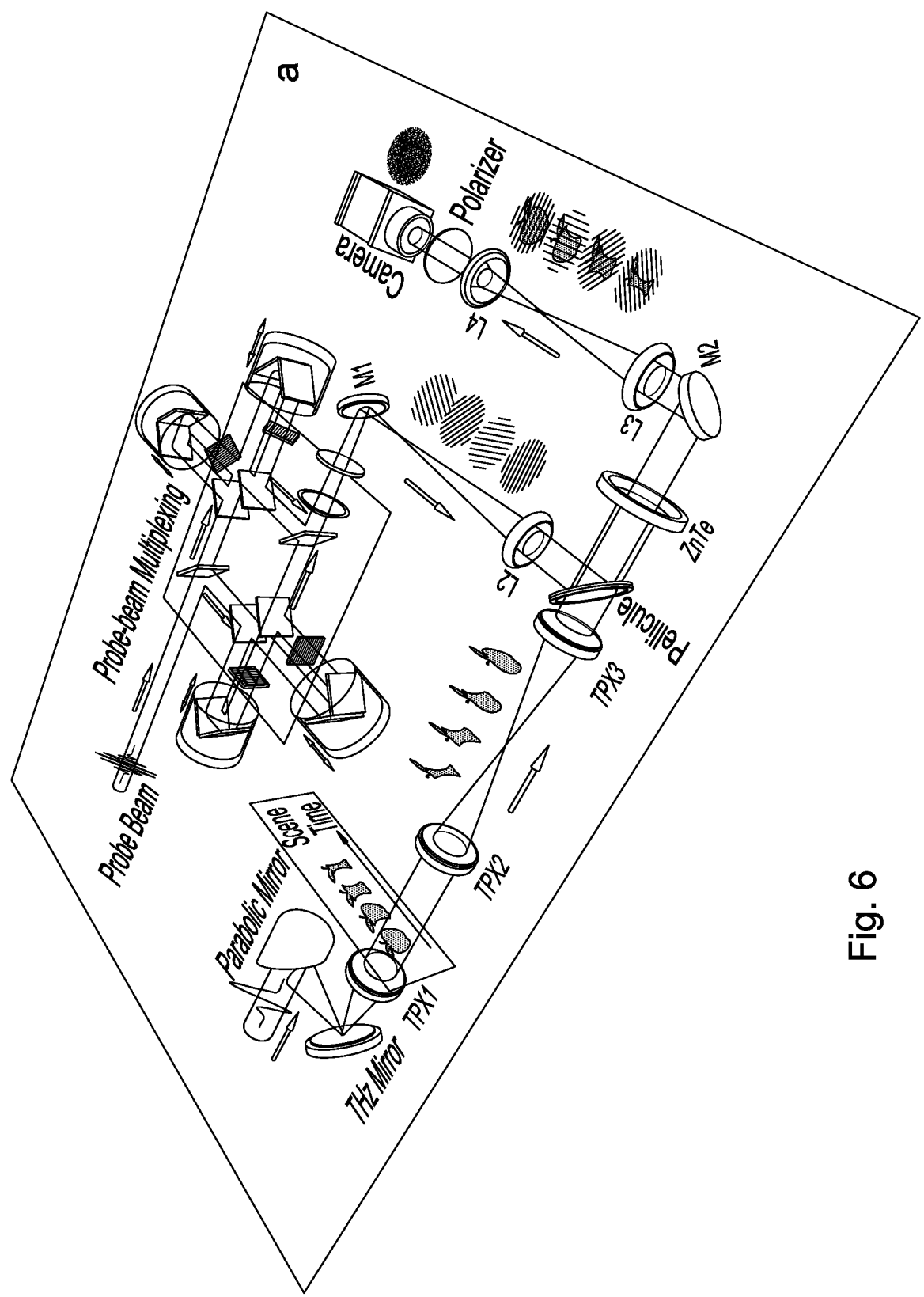
FIG. 6 show schematic of the single-shot ultrafast THz photography system according to an embodiment of an aspect of the present disclosure.
Figure 6:
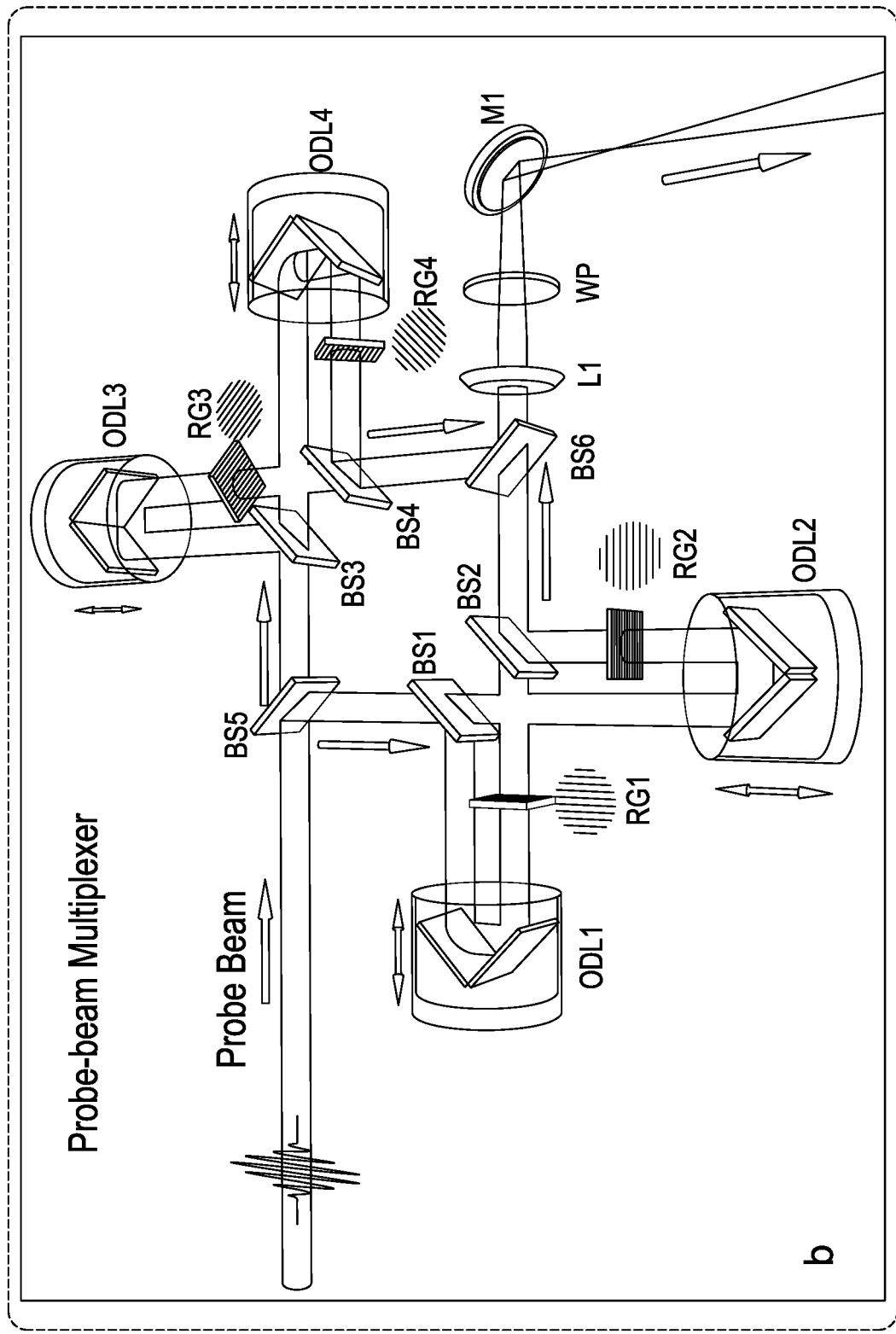

FIG. 6 shows schematics of a single-shot ultrafast THz imaging system according to an embodiment of an aspect of the present invention. The system is driven by an 800-nm Ti:Sapphire pulsed laser, which delivers the pump and probe beams with a pulse duration of 150 fs. A collimated THz beam, generated through optical rectification of the pump pulse into a 63°-cut $LiNbO_3$ crystal as will be detailed hereinbelow, passes through an ultrafast scene and is detected through the EOS technique implemented in a 1-mm-thick ZnTe crystal. The initial probe pulsed beam is split into four equally intense sub-pulses using a beam-splitter configuration. Each sub-pulse is guided into an optical delay line to control its arrival time, for multiplexing in the time domain. After being delayed, the sub-pulses are sent through four Ronchi gratings, each of them oriented along a unique angle, for multiplexing in the spatial-frequency domain. These four sub-pulses are then recombined together through the last beam splitter to form the final probe beam. The ±1 diffraction orders of the beam are collected with imaging lenses (L1 and L2 that form sinusoidal modulation patterns in the probe volume. This requires that the distance between the lens L1 and each grating is exactly equal to the lens focal length for each sub-pulse.

At last, the multiplexed probe beam, consisting of four sub-pulses with different modulation patterns and time delays, illuminates the detection crystal co-propagating with the THz wave that carries the temporal evolution of the ultrafast scene. The polarization of each sub-pulse is then modulated by the THz electric fields accordingly, producing the frame of the ultrafast scene at a specific time. All frames obtained via EOS are stacked into a single multiplexed image which is finally captured by a CCD camera. Although overlapped in the spatial domain, these frames are well separated in the Fourier domain, and thus, can be extracted and recovered computationally. The inter-frame time intervals are flexible and can be easily adjusted by varying the optical delay lines with a fine step size of 25 fs. In the system, the total number of frames is limited to four for simplicity, but can be arbitrarily increased by inserting additional pairs of beam-splitters and optical delay lines.

Figure 7:
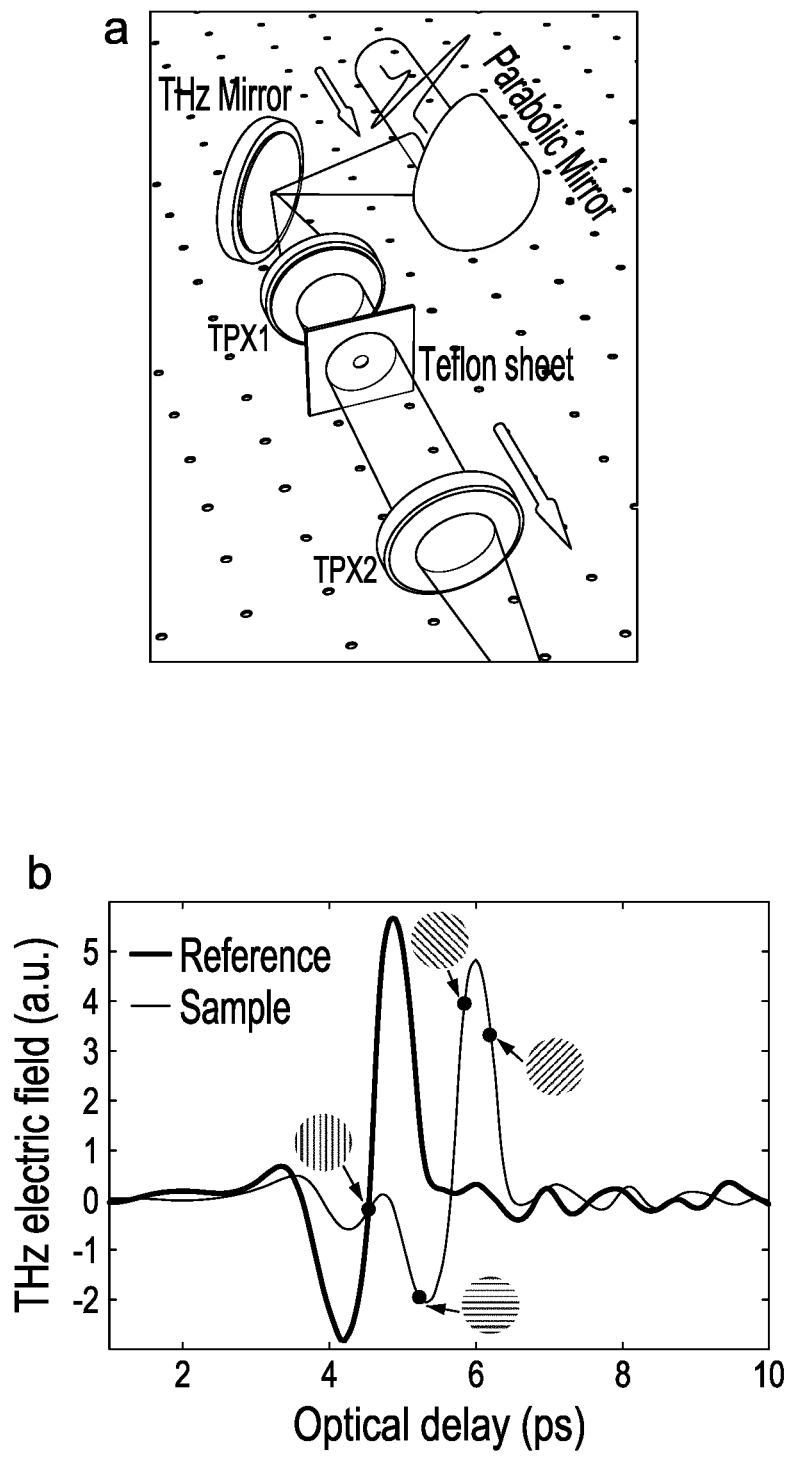
FIG. 7 show ultrafast imaging of the propagation of a bipolar THz pulse.
Figure 7:
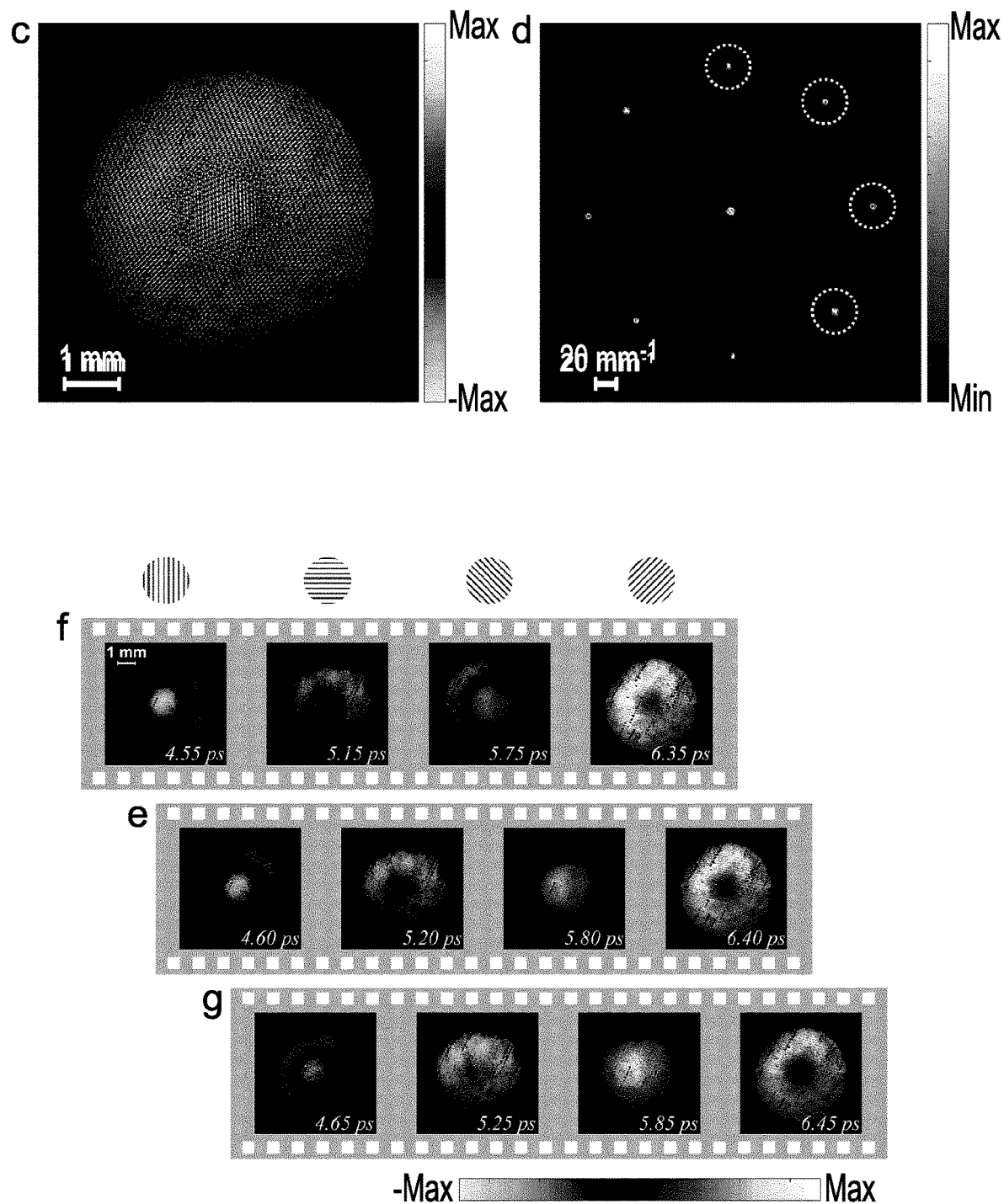

FIG. 7 show ultrafast imaging of the propagation of a bipolar THz pulse. FIG. 7A is a schematic of the experimental step corning the formation of the collimated THz beam for capturing the dynamic scene. The dynamic scene is a bipolar THz pulse passing through a Teflon sheet (thickness: 0.8 mm) with a pinhole (diameter: 2 mm) in the center. FIG. 7B shows THz waveforms acquired via the EOS technique with and without the insertion of the Teflon sample. The arrival times of the four sub-pulses for imaging are marked on the THz waveform. The inter-frame time intervals are equal and set to 0.60 ps. FIG. 7C shows the multiplexed image acquired by the CCD camera through a single exposure. FIG. 7D shows the 2D Fourier transform of FIG. 7C. The 'image copies' of the four frames are circled, which are extracted and processed to reconstruct the individual frames. FIG. 7E shows the recovered frames from the multiplexed image in FIG. 7C. FIG. 7F shows the recovered frames that were captured when the probe beam arrived 50 fs earlier relative to the case in FIG. 7E. FIG. 7G shows the recovered frames that were captured when the probe beam arrived 50 fs later relative to the case in FIG. 7E. The image contrast of the frames is the amplitude of the THz electric fields.

To demonstrate the ultrafast imaging capability of the system, a 'light-in-flight' scene was first imaged by capturing a THz pulse propagating through a Teflon sheet, which is opaque to the optical frequencies, with a pinhole in the center, as shown in FIG. 7A. Before imaging, the THz waveforms with and without placing the sample were recorded via the EOS technique and are plotted in FIG. 7B. By referring to the temporal evolution of the THz waveforms shown in this plot, the arrival time of the multiplexed probe beam is set to 4.60 ps with an inter-frame time interval of 0.60 ps, in order to capture representative frames of the dynamic scene under observation. FIG. 7C shows the multiplexed image captured by the camera within a single shot. Despite being spatially overlapped, these frames were well separated in the Fourier domain, as shown in FIG. 7D. Following the post-processing procedure described further hereinbelow, the four frames were extracted and reconstructed individually. The recovered frames, corresponding to the 2D distribution of the THz electric fields at four specific times, are shown in FIG. 7E. As expected, the central part of the THz beam that directly passed through the pinhole arrived first. This is because THz waves travel faster in the air than in the Teflon sheet. The estimated spatial resolution of the frame is about 0.56 mm, depending on the central frequency of the THz source (see FIG. 11). It is worth noting that the defects in the images are mainly attributed to the small voids in the ZnTe crystal that were inevitably introduced during the fabrication process. By altering the arrival time of the probe beam, the dynamics at other time positions can be obtained. FIGS. 7F and 7D display another two sets of representative frames that were captured when the probe beam was shifted by ±50 fs relative to the case in FIG. 7E. These time-lapse frames clearly reveal the spatial and temporal evolution of a bipolar THz pulse passing through the sample, as a result of different propagation speeds in different materials.

Figure 8:
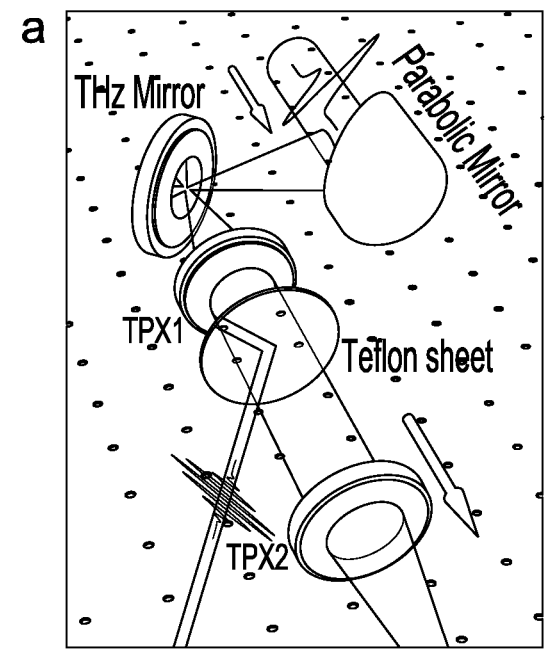
FIG. 8 show ultrafast imaging of the spatial and temporal dynamics of photo-excited carrier generation in silicon.
Figure 8:
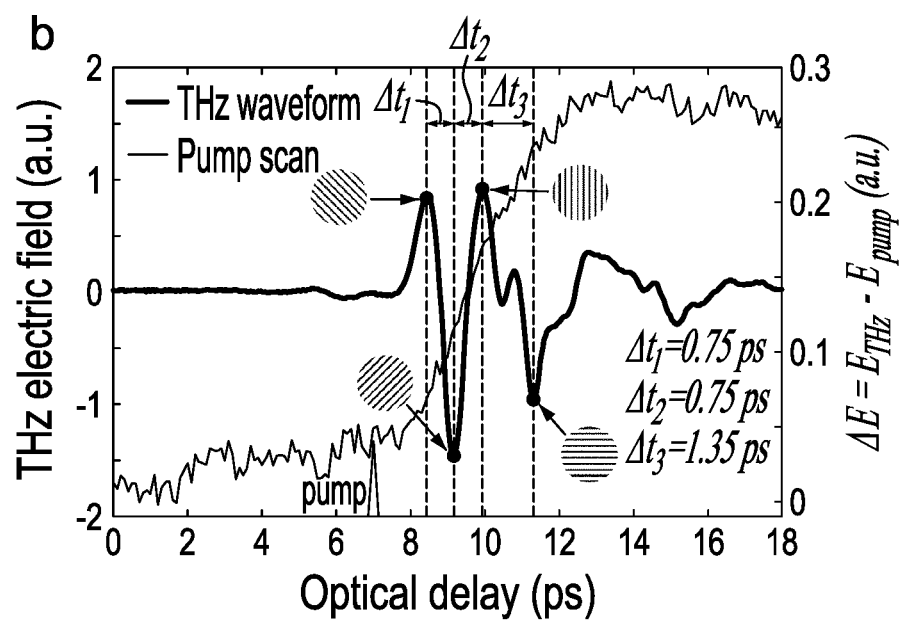
Figure 8:
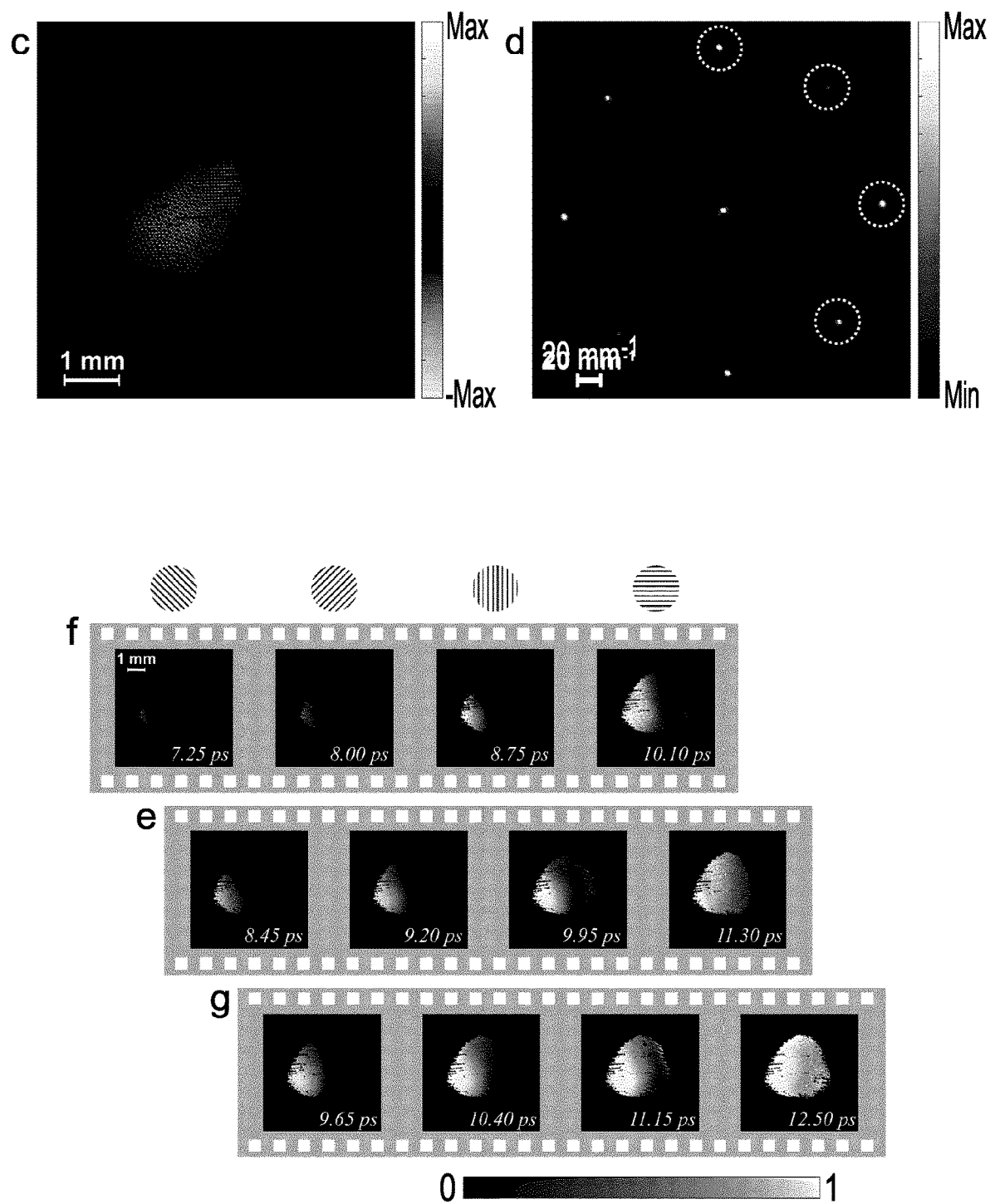

FIG. 8 show ultrafast imaging of the spatial and temporal dynamics of photo-excited carrier generation in silicon. FIG. 8A is a schematic of the experimental setup for the formation of collimated THz beam for capturing the dynamic scene. The dynamic scene is the carrier generation in an undoped silicon wafer (thickness: 500 µm) pumped by a near-infrared laser pulse (obtained from the main pump pulse of the system). The incident angle of the pump pulse is 30°, with a power of 50 mW. A thin silicon wafer (thickness: 35 µm) is attached onto the THz mirror in order to produce a multi-cycle THz pulse. FIG. 8B shows pump-probe measurement and the multi-cycle THz pulse for imaging. The optical pump-THz probe measurement was achieved by recording the change in THz transmission as the relative optical delay between the pump and probe varied. The arrival times of the sub-pulses were assigned and fixed at the four peaks of the THz pulse, corresponding to the frame intervals of 0.75 ps, 0.75 ps, and 1.35 ps, respectively. The first set of frames was taken when the first peak of the THz pulse was aligned at 8.45 ps. FIG. 8C shows the multiplexed image acquired by the camera. FIG. 8D shows the 2D Fourier transform of FIG. 8C, with image copies from each sub-pulse circled. FIG. 8E shows the recovered frames from the multiplexed image. FIG. 8F shows the recovered frames when the optical pump pulse was shifted 1.20 ps to the left relative to the case in FIG. 8E. FIG. 8G shows the recovered frames when the optical pump pulse was shifted 1.20 ps to the right relative to the case in FIG. 8E. The imaging contrast plotted in the frames is the modulation ratio calculated by dividing the individual frames by a reference frame, which was taken when the carriers within the illumination were fully excited (at 13.00 ps).

To further explore the potential applications of our system in advanced materials, the photo-excited carrier dynamics in semiconductors were visualized. As shown in FIG. 8A, measurements were carried out to monitor the ultrafast spatial and temporal dynamics of photo-excited carriers within a silicon wafer, with a thickness of 500 µm. With an oblique incidence, another optical pump beam for exciting the carries, obtained by splitting the main pump beam, illuminated the center of the silicon wafer, being overlapped with the THz beam. Such an ultrafast process was first characterized by performing a conventional optical pump-THz probe measurement based on the EOS technique. By fixing the time positon of the THz probe pulse, the change in its peak values ($\Delta E$) was recorded as the arrival time of the optical pump pulse was scanned. As shown in FIG. 8B, when the optical pump pulse arrived at similar times as the THz probe pulse (at about 7.20 ps), an increase of $\Delta E$ starts to be observed, as the photoexcitation gives rises to the generation of free carriers within the silicon wafer, thus changing its permittivity. The increase of $\Delta E$ lasted for about 5 ps and reached its maximum when carriers within the area illuminated by the optical pump pulse were fully excited. Therefore, in order to capture the 2D dynamics of such a about 5-ps-long process, a larger imaging time window, corresponding to the time duration of the THz pulse, is required in the following single-shot ultrafast imaging experiment. To this end, a thin silicon wafer, with a thickness of 35 µm, was attached onto the THz mirror, as shown in FIG. 8A. The multiple reflections which the original single-cycle THz pulse undergoes within the wafer can produce a multi-cycle THz pulse, which ensures an imaging time window of several picoseconds, as shown in FIG. 8B. The arrival times for the four sub-pulses in the multiplexed probe beam were assigned and fixed at the four peaks of the entire THz waveform. The first set of representative frames were taken when the optical pump started to strike on the wafer at 7.20 ps and the first peak of the THz pulse was aligned at 8.45 ps. FIG. 8C shows the multiplexed image obtained by the camera within a single shot, while its Fourier transform is depicted in FIG. 8D. Following the post-processing procedure as described further hereinbelow, the recovered frames are shown in FIG. 8E. The imaging contrast used here is the modulation ratio, calculated by dividing the acquired frame at a specific time by a reference frame, which is the image taken when the carriers are fully excited (beyond 13.00 ps). These frames illustrate that the carriers were excited from the left to the right side due to the oblique incidence of the optical pump pulse. FIGS. 8F and 8G display another two sets of representative frames when the arrival time of the optical pump pulse was shifted by ±1.20 ps relative to the case in FIG. 8E. The combination of these three sets provides a complete and clear view of the spatial and temporal dynamics of excited carriers in silicon upon illumination with an ultrafast laser pulse. Semiconductors such as silicon are typically opaque in a great part of the optical domain (energy bandgap of 1.12 eV) and thus, the ultrafast carrier dynamics excited ultrashort pulses cannot be easily visualized via conventional ultrafast optical imaging modalities.

The single-shot ultrafast THz photography system was thus shown to capture the time-lapse of transient events occurring in optically-opaque scenarios. The method essentially bypasses the need of any high-speed devices operating at THz wavelengths, yet it is effective in providing the spatial and temporal information of an ultrafast process with a sub-picosecond resolution through a single shot. The temporal resolution of the system is only limited by the mechanical resolution and precision of the optical delay lines, which can be as short as only a few tens of femtoseconds or less. The time duration of the probe pulse may have an impact on the image recovery. Specifically, when the frame interval is smaller than the pulse duration, the resultant interference pattern of two consecutive sub-pulses will impose an additional and uncontrollable modulation on the image. Such an undesired effect results in the occurrence of spurious frequency contents in the Fourier domain, in turn leading to a significant worsening of the recovered frames. The spatial resolution of the system can be enhanced by exploiting a near-field configuration. The system can function as a single-shot ultrafast THz microscope by attaching the objects directly onto the detection crystal, thus allowing us to capture transient events at the microscale. The system and method may provide unprecedented insights into a broad variety of ultrafast phenomena, especially for the ultrafast spatial and temporal dynamics that occur in advanced materials, such as solar cells, nanomaterials, topological insulators, and metal-organic frameworks.

The imaging system in FIG. 6 was driven by a Ti:Sapphire pulsed laser that delivers 2 mJ pulses with a 150-fs pulse duration at a 1-kHz repetition rate and a wavelength of 800 nm. The main pump and probe beams were obtained by means of a 90/10 beam-splitter. The THz generation was based on the optical rectification technique occurring in a 63°-cut $LiNbO_3$ crystal according to a titled-pulse-front excitation scheme[30]. Such a THz source provided a THz pulse train with a about 1.2-THz-wide spectrum (full-width-half-maximum) with a central frequency at about 0.5 THz. The THz beam was then collected by a series of off-axis parabolic mirrors ultimately forming a collimated beam with a diameter of about 1 cm, impinging on the sample to be imaged. The images carried by the THz wave were relayed onto the detection crystal by TPX lenses, each with a focal length of 100 mm. The probe beam was sent to the beam-splitter configurations, as shown in FIG. 6B. In particular, four identical Ronchi gratings (20 lp/mm) and optical delay lines were used for multiplexing the probe beam. The orientations of the four Ronchi gratings were set to 0°, 45°, 90°, and 135°, respectively. Imaging lenses (L1 and L2) with a focal length of 200 mm were used to form sinusoidal fringe patterns on the detection crystal. The THz pulses were detected by carrying out the EOS technique in a 1-mm-thick ZnTe <110> crystal. The optical pump beam for the excitation of carriers in silicon was obtained from the main pump beam using another 90/10 beam-splitter. The multiplexed image was captured by a CCD camera (pco.pixelfly) with a total size of 1392×1040 pixels and a resolution depth equivalent of 14 bits. The pixel size is 6.45 µm×6.45 µm. The orientation of the polarizer in front of the CCD camera was properly selected, in order to properly detect both the positive and negative THz electric fields, thus leading to the formation of bipolar frames.

The EOS technique can accurately measure both the amplitude and the phase of THz electric fields. The THz pulses introduce birefringence in the ZnTe crystal, which causes a change in the polarization state of a co-propagating probe beam. By using a quarter-wave plate and polarizer, the change of the polarization can be mapped on a CCD camera as an intensity modulation. In general, the achieved image P(x, y, t) follows the relation with the THz electric field $E_{THz}(x, y, \omega_{THz}, t)$ as follows:

$$P(x, y, t) = \frac{1}{c} I_0(x, y, t) \omega L n_0^3(\omega) r_{14} E_{THz}(x, y, \omega_{THz}, t), \quad (1)$$

c is the speed of light in vacuum, $I_0(x, y, t)$ is the intensity distribution of the optical probe on the crystal upon a uniform illumination. L is the thickness of the crystal and $\omega$ is the frequency of the probe. $n_0(\omega)$ is the refractive index and $r_{14}$ is the electro-optic coefficient of the detection crystal.

In the present configuration, the probe beam is multiplexed in both time and spatial-frequency domains, then its intensity distribution I(x, y, t) is modified as follows:

$$I(x, y, t) = \sum_{n=1}^{4} I_n(x, y, t - \Delta t_{Dn}) M_n(x, y), \quad (2)$$

$$I_n(x, y, t - \Delta t_{Dn}) = \begin{cases} 0 & t < \Delta t_{Dn} \\ I_0(x, y, t) & t \geq \Delta t_{Dn} \end{cases}, \quad (3)$$

$\Delta t_{Dn}$ is the time delay induced by the optical delay line in path n. $M_n(x,y)$ is the spatial modulation pattern produced by the Ronchi grating, which consists of periodic stripes. In principle, vertical stripes can be modeled as periodic square waves in the x-direction as follows:

$$M_n(x, y) = M_n(x + T, y) = \begin{cases} 1 & 0 \leq |x| \leq T/4 \\ 0 & T/4 < |x| \leq T/2 \end{cases}, \quad (4)$$

T is the period of the modulation pattern. By integrating Relations. (2)-(4) into Relation (1) and taking the spatial Fourier transform, the multiplexed image achieved via EOS in the spatial-frequency domain can be expressed as follows:

$$\tilde{P}(k_x, k_y) = \sum_{n=1}^{4}\left[\tilde{S}_n \otimes \sum_{m=-\infty}^{+\infty} \frac{2\sin(mk_0 T/4)}{m}\delta(k'_{xn} - mk_0)\right], \quad (5)$$

$$\tilde{S}_n = F\left[\frac{1}{c}I_n(x, y, t-\Delta t_{Dn})\omega L n_0^3(\omega) r_{14} E_{THz}(x, y, \omega_{THz}, t-\Delta t_{Dn})\right]. \quad (6)$$

F represents the Fourier transform and $\otimes$ denotes the convolution operator. In Relation (5), the right-hand side of $\otimes$ comes from the Fourier transform of the Ronchi grating. This is because the multiplication of the images with the modulations in the spatial domain is equivalent to the convolution of the images and modulations in the spatial-frequency domain. $k_0=2\rho/T$ is the fundamental spatial frequency and $k'_{xn}k_x \cos\theta_n + k_y \sin\theta_n$, where $\theta_n$ is the rotation angle of the modulation pattern in path n. Based on Relations (5) and (6), it is found that the achieved image after the EOS detection is the sum of four images. The Dirac delta function $\delta$ will create copies of the original image's Fourier transform $\tilde{S}_n$ and shift it to a unique spatial-frequency location corresponding to the modulation pattern in path n.

Figure 9:
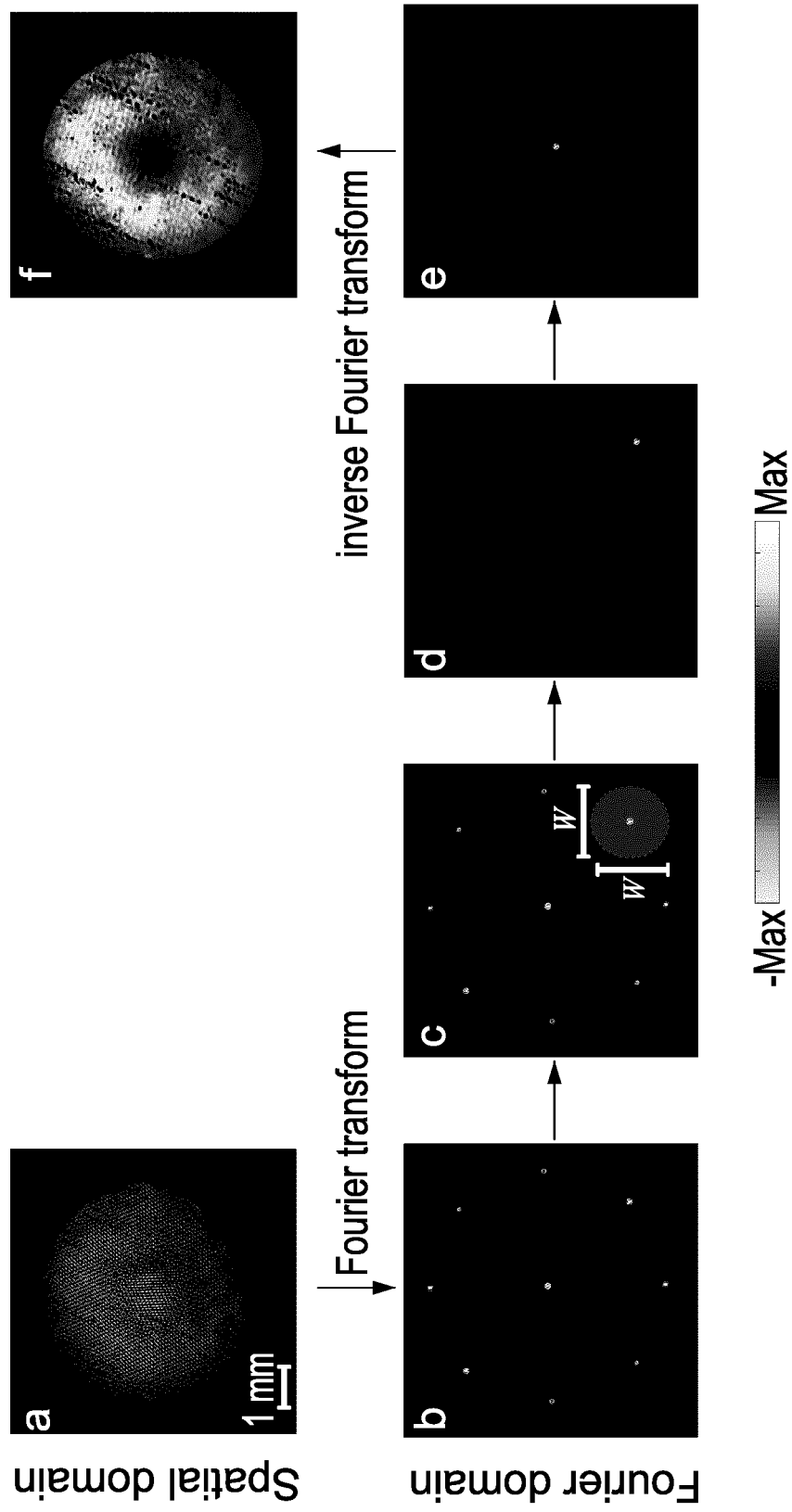
FIG. 9 show post-processing procedure.

In a post-processing procedure to recover the image of each frame, one image copy in the Fourier domain is selected and first isolated using a spatial-frequency band-pass filter, in turn removing all the other image copies. A 2D band-pass filter with a rectangular window is used in the present example. The width of the window in pixels influences the spatial resolution of the recovered frame. The larger the window width, the more frequency content is preserved, because any spatial frequency information outside the window is discarded. The width of the filter is selected to be small enough to prevent the interference or cross-talk with the adjacent image copies of other frames. In the present experiments, the width of the filter in pixels is 140. The influence of the width is investigated in FIG. 10. The isolated spatial-frequency content is then digitally transferred to the origin of the Fourier domain, in turn transforming the sinusoidal modulation into a uniform illumination. Finally, by applying the inverse Fourier transform on this filtered and rearranged spectrum, the original frame which was encoded at the shifted region in the Fourier domain is recovered. FIG. 9 shows the detailed illustration of this post-processing procedure.

FIG. 9 show post-processing procedure, taking the recovery of the fourth frame in FIG. 7E as an example. FIG. 9A shows the raw multiplexed image captured by the CCD. FIG. 9B shows the 2D Fourier transform of FIG. 9A. FIG. 9C shows the 2D band-pass filter with a width of w used to select the individual frame. The width w chosen here is 140 in terms of the number of pixels in Fourier domain. FIG. 9D shows the band-pass filter is multiplied with the Fourier transform of the raw image, in turn removing the other image copies. FIG. 9E shows the filtered frequency content is shifted to the center of the Fourier domain, which transforms the sinusoidal modulation into a uniform illumination. FIG. 9F shows an original frame (the fourth frame) is recovered by applying the inverse Fourier transform of the filtered and rearranged spectrum in FIG. 9E.

Figure 10:
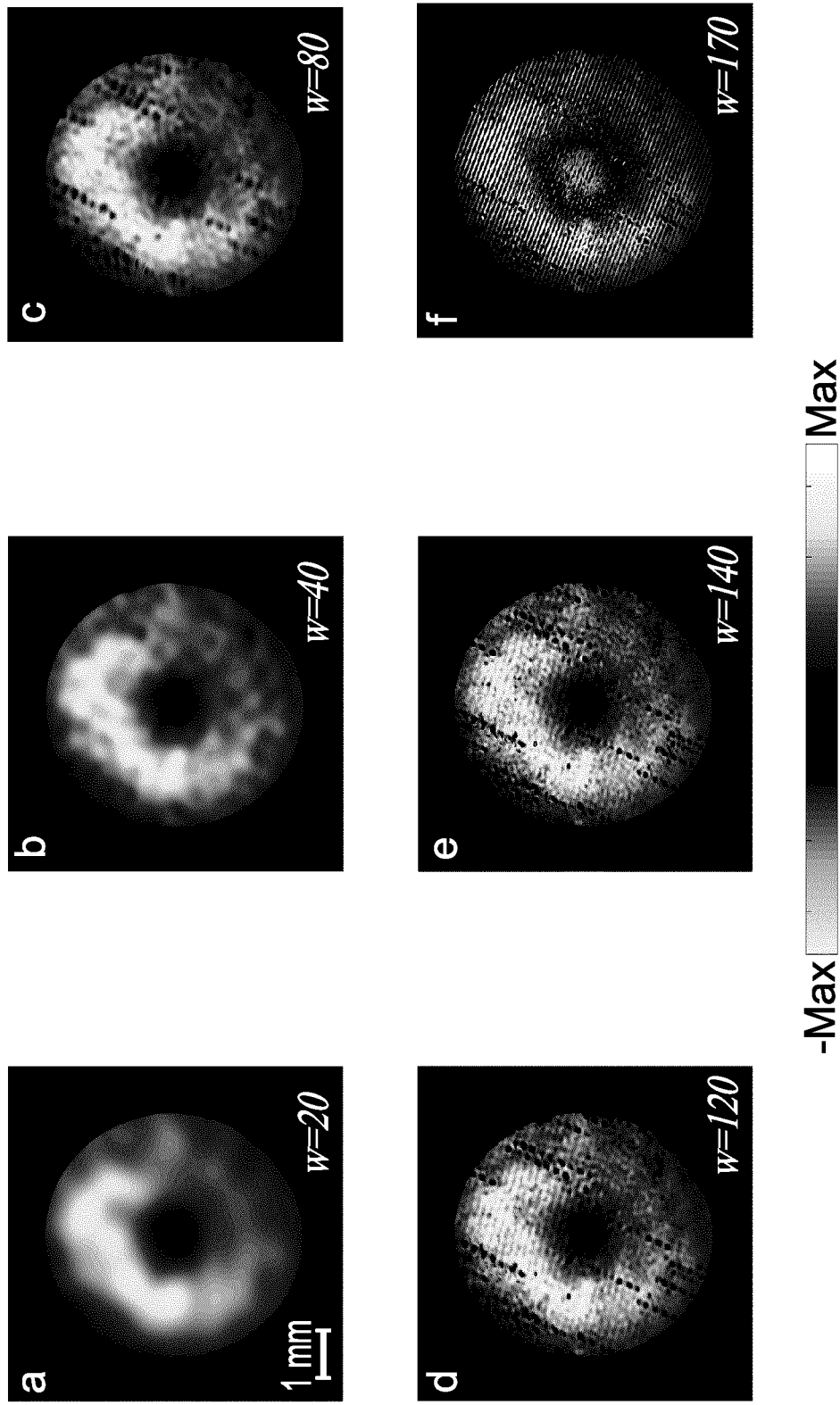
FIG. 10 show influence of the width of the 2D band-pass filter.

FIG. 10 show influence of the width of the 2D band-pass filter. FIGS. 10A-10F display the fourth frame that was extracted and recovered using different widths of the band-pass filter. As the width increases, more features (small voids in the ZnTe crystal) in the frame can be identified. This is because the larger its width, the more spatial-frequency content it preserves. The width of the filter is also selected to be small enough to avoid the interference or cross-talk with the adjacent image copies of other frames. As shown in FIG. 10F, when the w=170, the interference between frames is observed in the recovered frame. These figures show that, small filters provide best selectivity without any interference between adjacent frames, whereas large filters provide best image resolution.

Figure 11:
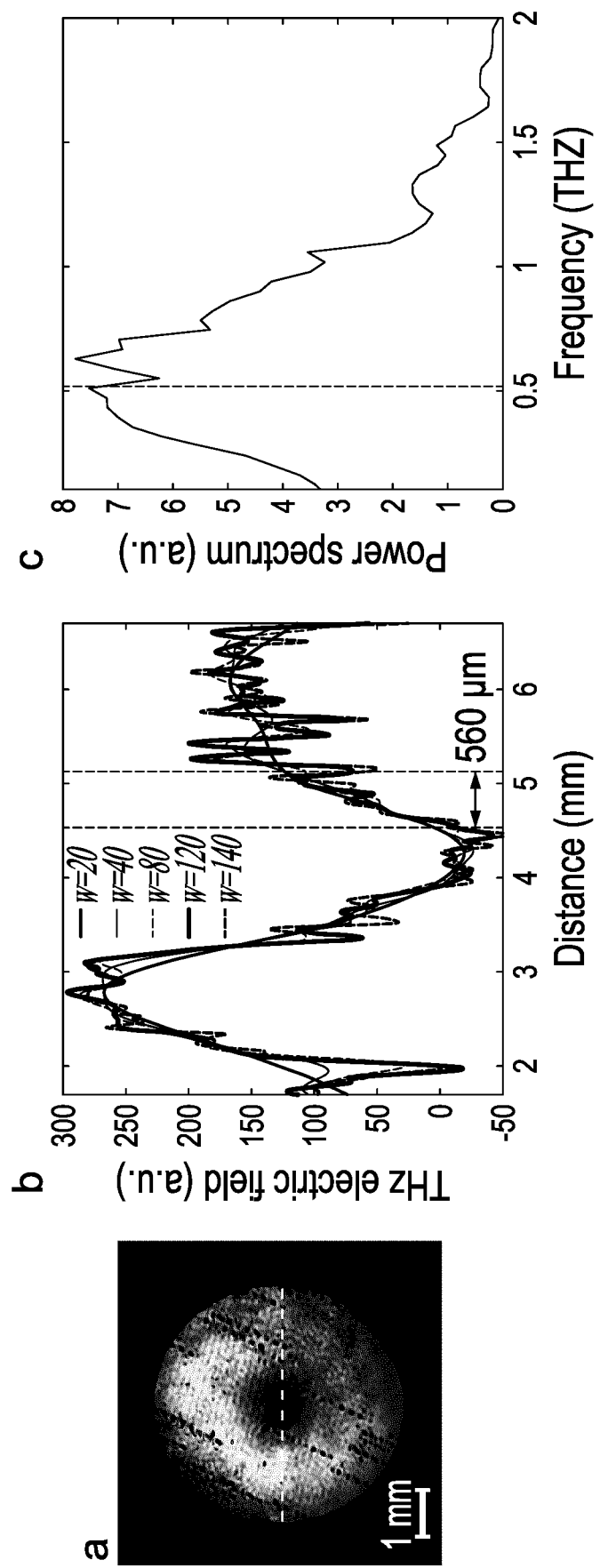
FIG. 11 show the spatial resolution of the recovered frame, taking the fourth frame in FIG. 7E as an example.

FIG. 11 show the spatial resolution of the recovered frame, taking the fourth frame in FIG. 7E as an example. The spatial resolution was estimated by investigating the width of an edge-response in the image. The width of the edge response was calculated by measuring the distance between 10% and 90% of its maximum value. FIG. 11A shows the fourth frame recovered. FIG. 11B shows the THz electric fields distribution across the line highlighted in FIG. 11A using different widths of the band-pass filter. FIG. 11C shows the spectrum of the THz source achieved from $LiNbO_3$. It is shown that the width of the band-pass filter does not influence the estimation of the spatial resolution. This is because the image was captured by THz waves in a far-field configuration, in which the spatial resolution mainly depends on the central frequency of the THz source. The estimated spatial resolution is about 0.56 mm, corresponding to the wavelength at about 0.5 THz. The spatial resolution achieved in THz image is relatively low compared with that achieved with optical wavelengths. Such a spatial resolution can be maintained even in the case of w=20. However, the width of the band-pass filter has an impact on the features captured by the optical probe. This is also the reason why small voids in the ZnTe can be identified as the width of the filter is increased (shown in FIG. 10).

The present single-shot multi-frame ultrafast THz imaging method comprises generating a multiplexed probe beam which contains four sub-pulses, using beam splitters, Ronchi gratings, and optical delay lines, for capturing the time evolution of an ultrafast scene carried by a THz beam. The method uniquely encodes the individual frame captured by each sub-pulse into distinct spatial frequency shifts of the multiplexed image in the spatial Fourier domain; The multiplexed image acquired by a charged-coupled device (CCD), containing the time evolution of the scene from each sub-pulse, is de-multiplexed; and the individual frames are extracted via post-processing, yielding both the spatial and temporal information of the ultrafast scene.

Encoding optically allows overcoming speed limits of electronic and/or mechanical shutters in high-speed cameras.

The method may be extended from single-shot THz imaging up to femtoseconds, for applications in ultrafast physics and chemistry for example. Furthermore, the inter-frame time intervals are flexible and can be adjusted by varying the optical delay lines, while the number of frames can be increased by using additional beam splitters and optical delay lines.

There is thus provided a method and a system for single-shot multi-frame ultrafast THz imaging based on spatial-frequency multiplexing. This method encodes the temporal evolution of the ultrafast events occurring in a single shot into different spatial frequency shifts in the Fourier domain, and thus, producing multiplexed images. These multiplexed images contain 2D information from several points in time, which can be de-multiplexed and separated computationally.

Due to their flexibility and expandability, the present method and system may be applied for imaging a broad variety of ultrafast phenomena. With the capability of recording non-repeatable and difficult-to-reproduce transient events, the present imaging system and method may be used for investigating advanced materials which are opaque to conventional optical frequencies.

The scope of the claims should not be limited by the embodiments set forth in the examples but should be given the broadest interpretation consistent with the description.

The invention claimed is:

1. A system for single-shot multi-frame ultrafast terahertz imaging of a scene, the system comprising:
   a laser producing a pump beam and a probe beam;
   a THz generator generating a THz beam from said pump beam, the THz beam being passed through the scene;
   a multiplexer selected for multiplexing the probe beam in the time domain and in the spatial-frequency domain, yielding a multiplexed probe beam;
   a THz detector detecting a THz beam passing through the scene;
   a first optical lens guiding the multiplexed probe beam to the THz detector;
   a polariser selected for conversion of the multiplexed probe beam into mutually orthogonal linear polarized beams;
   a camera; and
   a second optical lens selected for directing the mutually orthogonal linear polarized beams to the camera.

2. The system of claim 1, wherein the pump beam and the probe beam have a pulse duration in a range between 50 fs and 200 fs.

3. The system of claim 1, wherein the multiplexer comprises delay lines selected for multiplexing the probe beam in the time domain and gratings selected for multiplexing the probe beam in the spatial-frequency domain.

4. The system of claim 1, wherein the THz generator is a first Pockels crystal.

5. The system of claim 1, wherein the THz generator is one of: a ZnTe crystal, a LiNbO$_3$ crystal, and a GaSe crystal.

6. The system of claim 1, wherein the THz detector is a Pockels crystal.

7. The system of claim 1, wherein the THz detector is one of: a ZnTe crystal, a LiNbO$_3$ crystal, and a GaSe crystal.

8. The system of claim 1, wherein the multiplexer comprises optical delay lines selected for multiplexing the probe beam in the time domain and gratings selected for multiplexing the probe beam in the spatial-frequency domain, first beam-splitters splitting the probe beam into equally intense sub-pulses, and each sub-pulse being directed into one of the optical delay lines to control respective arrival times separately, the gratings receiving the delayed sub-pulses, each grating being selected with a unique orientation for spatial-frequency multiplexing, the system comprising a lens collecting ±1 diffraction orders of the beam and forming sinusoidal fringe patterns in a volume of the probe beam, a final beam-splitter recombining the sub-pulses to form the multiplexed probe beam.

9. The system of claim 1, wherein the multiplexer comprises optical delay lines selected for multiplexing the probe beam in the time domain and gratings selected for multiplexing the probe beam in the spatial-frequency domain, first beam-splitters splitting the probe beam into equally intense sub-pulses, and each sub-pulse being directed into one of the optical delay lines to control respective arrival times separately, the gratings receiving the delayed sub-pulses, each grating being selected with a unique orientation for spatial-frequency multiplexing, the system comprising an imaging lens collecting ±1 diffraction orders of the beam and forming sinusoidal fringe patterns in a volume of the probe beam, a final beam-splitter recombining the sub-pulses to form the multiplexed probe beam, a distance between the third lens and the gratings being selected equal to a focal length of the imaging lens for each sub-pulse.

10. The system of claim 1, wherein the multiplexed probe beam first illuminates the THz detector in a counter-propagation direction of the THz beam, and the multiplexed probe beam co-propagates with the THz beam, polarization of each sub-pulses of the multiplexed probe beam being modulated by THz electric fields, and thus, carrying a 2D information of the scene at four different times.

11. The system of claim 1, wherein the first optical lens is selected with a focal length in a range between 100 mm and 500 mm.

12. The system of claim 1, wherein the second optical lens is selected with a focal length in a range between 100 mm and 500 mm.

13. The system of claim 1, wherein the camera is a charged-coupled device camera.

14. The system of claim 1, wherein the multiplexer comprises beam splitters and gratings, the beam-splitters splitting the probe beam into equally intense sub-pulses, and each sub-pulse being directed into an optical delay line to control respective arrival times separately, the gratings receiving the delayed sub-pulses, each grating being selected with a unique orientation for spatial-frequency multiplexing, the system comprising an imaging lens collecting ±1 diffraction orders of the beam and forming sinusoidal fringe patterns in a volume of the probe beam, a final beam-splitter recombining the sub-pulses to form the multiplexed probe beam, a distance between the imaging lens and the gratings being selected equal to a focal length of the imaging lens for each sub-pulse, wherein the gratings are Ronchi gratings selected with frequencies in a range between 10 lp/mm and 50 lp/mm.

15. The system of claim 1, wherein the polarization beam splitter converts the multiplexed probe beam into mutually orthogonal linear polarized beams and the camera captures two polarization intensities of the multiplexed probe beam to produce an image.

16. The system of claim 1, wherein the polarization beam splitter converts the multiplexed probe beam into mutually orthogonal linear polarized beams and the camera captures two polarization intensities of the multiplexed probe beam to produce an image an overlapped/multiplexed image of different frames related to sub-pulses comprising the probe beam, each frame, corresponding to 2D information of the scene at different times.

17. The system of claim 1, wherein the polarization beam splitter is a Wollaston prism.

18. A method for single-shot multi-frame ultrafast terahertz imaging of a scene, comprising:
   generating a pump beam and a probe beam;
   generating a THz beam from the pump beam and passing the THz beam through the scene;
   multiplexing the probe beam in the time domain and in the spatial-frequency domain, yielding a multiplexed probe beam;
   detecting a THz beam passing through the scene
   guiding the multiplexed probe beam to a THz detection crystal and converting the multiplexed probe beam into mutually orthogonal linear polarized beams;
   guiding the mutually orthogonal linear polarized beams to a camera; and
   recovering frames of the scene from multiplexed images acquired by the camera.

19. The method of claim 18, comprising using crystals for said generating the THz beam and for said detecting the THz beam using electro-optic sampling.

20. The method of claim 18, wherein the pump beam and the probe beam have a pulse duration in a range between 50 fs and 200 fs.

* * * * *